(12) United States Patent
Wang et al.

(10) Patent No.: US 8,391,594 B1
(45) Date of Patent: Mar. 5, 2013

(54) METHOD AND APPARATUS FOR GENERATING VARIABLE-WIDTH BORDER MASKS

(75) Inventors: Jue Wang, Seattle, WA (US); Sarah Kong, Cupertino, CA (US)

(73) Assignee: Adobe Systems Incorporated, San Jose, CA (US)

( * ) Notice: Subject to any disclaimer, the term of this patent is extended or adjusted under 35 U.S.C. 154(b) by 890 days.

(21) Appl. No.: 12/474,135

(22) Filed: May 28, 2009

(51) Int. Cl.
*G06K 9/34* (2006.01)
(52) U.S. Cl. ........ 382/164; 382/100; 382/107; 382/111; 382/128; 382/162; 382/167; 382/173; 382/199
(58) Field of Classification Search .................. None
See application file for complete search history.

(56) References Cited

U.S. PATENT DOCUMENTS

| | | | |
|---|---|---|---|
| 2005/0105786 A1* | 5/2005 | Moreau-Gobard et al. | 382/128 |
| 2008/0260221 A1* | 10/2008 | Unal et al. | 382/128 |
| 2009/0097728 A1* | 4/2009 | Lee et al. | 382/131 |
| 2009/0290795 A1* | 11/2009 | Criminisi et al. | 382/173 |
| 2010/0046830 A1* | 2/2010 | Wang et al. | 382/164 |
| 2010/0061628 A1* | 3/2010 | Yamada | 382/167 |
| 2010/0111370 A1* | 5/2010 | Black et al. | 382/111 |
| 2010/0246956 A1* | 9/2010 | Porikli et al. | 382/173 |
| 2011/0007933 A1* | 1/2011 | Lempitsky | 382/100 |
| 2011/0229024 A1* | 9/2011 | El-Maraghi et al. | 382/162 |

OTHER PUBLICATIONS

Christoph Rhemann, Carsten Rother, Alex Rav-Acha, and Toby Sharp "High Resolution Matting via interactive trimap segmentation" Jun. 2008.*
U.S. Appl. No. 11/986,476, "Tools for spatially-localized color and tone manipulation,", filed Nov. 21, 2007, Aseem Agarwala and Yuanzhen Li.
Antonio Criminisi, Toby Sharp, and Andrew Blake, GeoS: Geodesic Image Segmentation,' Microsoft Research, Cambridge, UK, Date published: apparently Jan. 1, 2008, Proceedings of ECCV 2008.
Yuanzhen Li, Edward Adelson, Aseem Agarwala, "ScribbleBoost: Adding Classification to Edge-Aware Interpolation of Local Image and Video Adjustments," Computer Graphics Forum (Proceedings of EGSR 2008). 27(4), pp. 1255-1264, 2008.
Ivo D. Dinov, "Expectation Maximization and Mixture Modeling Tutorial," 2008.
Rahman Farnoosh, Gholamhossein Yari and Behnam Zarpak, "Image Segmentation using Gaussian Mixture Models", 8 pages, 2006.
Yiming Wu; Xiangyu Yang; Kap Luk Chan, "Unsupervised Color Image Segmentation Based on Gaussian Mixture Model", 4 pages.
Xue Bai, Guillermo Sapiro, "A Geodesic Framework for Fast Interactive Image and Video Segmentation and Matting," iccv, pp. 1-8, 2007 IEEE 11th International Conference on Computer Vision, 2007.
U.S. Appl. No. 12/474,030, filed May 28, 2009.

*Primary Examiner* — Anand Bhatnagar
*Assistant Examiner* — Tsung-Yin Tsai
(74) *Attorney, Agent, or Firm* — Wolfe-SBMC

(57) ABSTRACT

Methods and apparatus for generating variable-width border masks for objects in input images. Given an input image and an initial binary selection of an object in the image, a variable-width border mask method may be applied to automatically generate an accurate, variable-width border mask for the object. An initial border mask may be generated. An initial foreground probability map may be generated within the initial border mask using a Gaussian Mixture color modeling technique. A geodesic smoothing technique may be applied to the initial foreground probability map to reduce or remove noise. An optimization technique may be applied to optimize the foreground boundary, and a final variable-width border mask may be generated. The variable-width border mask may be used as input to image matting algorithms to generate an accurate alpha mask of the foreground object selected from the input image.

20 Claims, 9 Drawing Sheets

METHOD AND APPARATUS FOR GENERATING VARIABLE-WIDTH BORDER MASKS

BACKGROUND

Description of the Related Art

With advances in digital imaging systems, using matting techniques to create novel composites or to facilitate other editing tasks has gained increasing interests, from both professionals as well as consumers. Matting refers to the problem of accurate foreground extraction from images and video. Specifically, an observed image is modeled as a convex combination of a foreground image and a background image, using an alpha matte as interpolation coefficients, and matting techniques try to recover the alpha matte with the help of additional constraints provided by the user. Once matting is successful, the alpha matte can be used as a soft mask to apply a variety of object-based editing.

Various matting approaches have been proposed to estimate foreground mattes from natural images. A conventional approach first generates a border mask or region with an inner (foreground) edge and an outer (background) edge, and then uses this border mask as input to an alpha matting technique or image matting algorithm. Conventionally, a fixed border width has been used for the border mask. FIG. 1A shows a border mask generated with a fixed border width according to conventional techniques. FIG. 1B shows an example alpha matte generated from the fixed-width border mask of FIG. 1A. As shown in FIG. 1B, by using a fixed width border mask as input to conventional image matting algorithms, the final object mask may include noticeable errors; parts of the image that are actually background may erroneously be included in the foreground.

SUMMARY

Various embodiments of methods and apparatus for generating variable-width border masks for objects in input images are described. Given an input image and an initial binary selection of an object in the image, embodiments of a variable-width border mask method may be applied to automatically generate an accurate, variable-width border mask for the object, where the border is wider for fuzzy regions, and thinner for near-solid boundaries; thus the actual border of the foreground object may be tightly and accurately covered.

In embodiments of a variable-width border mask method, an input image and object mask representing the initial binary selection may be obtained. The input image may be a digitally-captured image such as a digital photograph, a digitized image such as a digitized conventional photograph, a digital video frame, or in general any digital image. The initial binary selection may be specified or provided by a user. In some embodiments, the input object mask may be a bitmap or similar data structure that indicates the selected region inside the binary selection curve. Some embodiments may receive other input, such as a maximum width value as described below.

Given the input image and the initial object mask, an initial border mask may be generated. In some embodiments, this initial border mask is of a uniform width. In some embodiments, the uniform width is set to a maximum width for the border mask. In some embodiments, the value of the maximum width parameter may be specified by the user. The initial border mask may define a range for the variable-width border mask method; the final variable-width border mask may lie within the initial (maximum width) border mask, but not extend outside it.

An initial foreground probability map may be generated within the initial border mask. A Gaussian Mixture color modeling technique may be used in generating the initial foreground probability map. In some embodiments this technique may generate a foreground Gaussian Mixture model (GMM) and a background GMM from the initial border mask. Some embodiments may use pixels at the inner (foreground) border of the initial border mask to train the foreground GMM, and pixels at the outer (background) border of the initial border mask to train the background GMM. After training the GMMs, the GMMs may be applied to the initial border mask to generate an initial foreground probability map. The initial foreground probability map may include all pixels and only the pixels within the initial foreground mask. Pixels may be classified as foreground pixels (e.g., with a foreground probability of 1.0), background pixels (e.g., with a foreground probability of 0), or with a foreground probability between 0 and 1.0.

A geodesic smoothing technique may be applied to the initial foreground probability map to reduce or remove noise; a smoothed foreground probability map is generated. An optimization technique may be applied to optimize the foreground boundary, and a final variable-width border mask may be generated. The final variable-width border mask may be output. The variable-width border mask may, for example, be used as input to image matting algorithms to generate an accurate alpha mask of the foreground object selected from the input image. Alpha mattes generated using the variable-width border mask method may be more accurate than alpha mattes generated using conventional fixed-width border masking techniques.

Figure 1A:
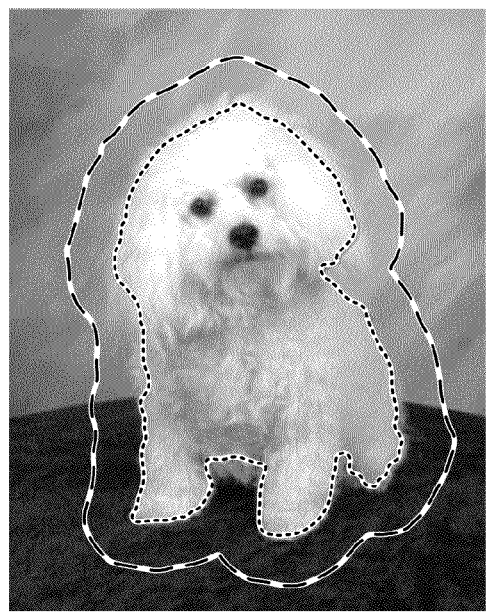
FIG. 1A shows a border mask generated with a fixed border width according to conventional techniques.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 2A:
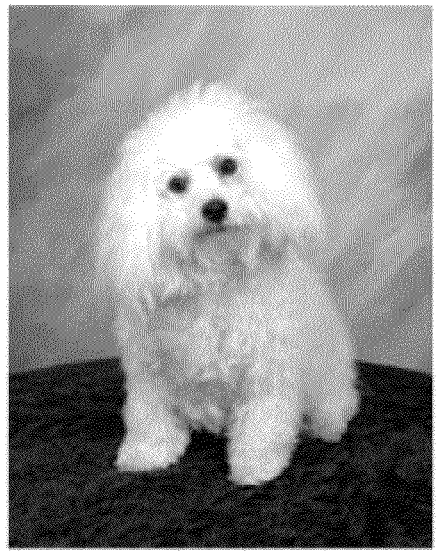
FIG. 2A shows an example input image.
Figure 2B:
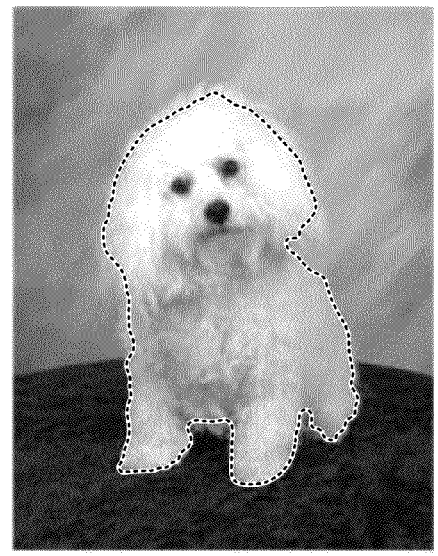
FIG. 2B shows an initial binary selection of an object in the example image shown in FIG. 2A.
Figure 2C:
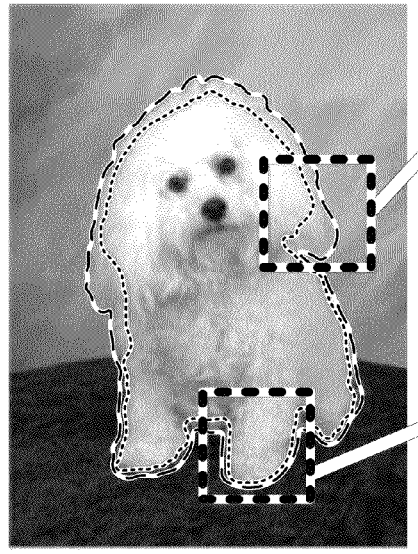
FIG. 2C shows an example of a variable-width border mask generated from the input shown in FIGS. 2A and 2B according to some embodiments.
Figure 2D:
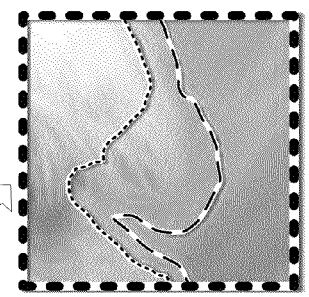
FIGS. 2D and 2E show zoom-ins to selected regions of the variable-width border mask represented by the rectangles shown in FIG. 2C.
Figure 2E:
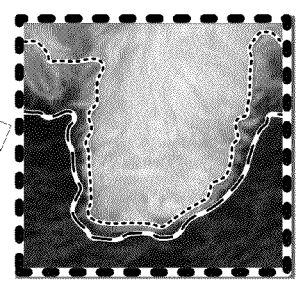

Various embodiments of methods and apparatus for generating variable-width border masks for objects in input images are described. Embodiments of a variable-width border mask method may accept an image and an initial binary selection as input. FIG. 2A shows an example input image. The input image may be a digitally-captured image such as a digital photograph, a digitized image such as a digitized conventional photograph, a digital video frame, or in general any digital image. The initial binary selection may be specified or provided by a user. FIG. 2B shows an initial binary selection of an object (the dog) in the example image shown in FIG. 2A. The dotted line represents the initial binary selection. Given an input image with a desired object to be extracted, the user may generate a binary selection for an object using a variety of selection tools provided by various image processing or editing applications. Adobe® Photoshop® is an example of one such application that may be used. Alternatively, the binary selection may be automatically generated by image processing software. However, this initial binary selection may not cover a fuzzy boundary of the object, as can be seen in FIG. 2B. Given the input image and the initial selection, embodiments of the variable-width border mask method may be applied to automatically generate an accurate, variable-width border mask for the object, where the border is wider for fuzzy regions, and thinner for near-solid boundaries; thus the actual border of the foreground object may be tightly and accurately covered. FIG. 2C shows an example of a variable-width border mask generated from the input shown in FIGS. 2A and 2B according to some embodiments. FIGS. 2D and 2E show zoom-ins to selected regions of the variable-width border mask represented by the rectangles shown in FIG. 2C.

Figure 1B:
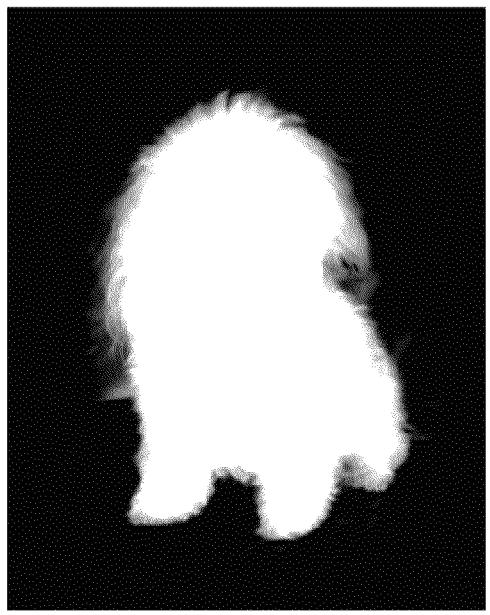
FIG. 1B shows an example alpha matte generated from the fixed-width border mask of FIG. 1A.
Figure 3A:
FIG. 3A shows an example of a variable-width border mask generated from the input shown in FIGS. 2A and 2B according to some embodiments.
Figure 3B:
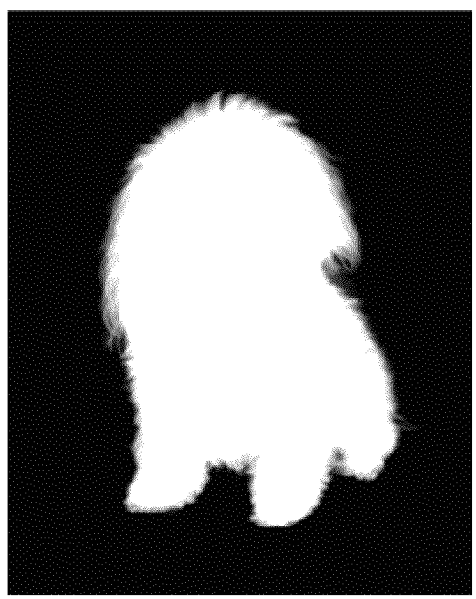
FIG. 3B shows an example alpha matte that may be generated from the variable-width border mask of FIG. 3A.

The variable-width border mask generated by embodiments may, for example, be used as input to image matting algorithms to generate an accurate alpha mask of the foreground object selected from the input image. FIG. 3A shows an example of a variable-width border mask generated from the input shown in FIGS. 2A and 2B according to some embodiments. FIG. 3B shows an example alpha matte that may be generated from the variable-width border mask of FIG. 3A. A comparison of FIG. 3B to FIG. 1B shows that the alpha matte of FIG. 3B generated using the variable-width border mask of FIG. 3A is more accurate than the alpha matte of FIG. 1B generated using the conventional fixed-width border matte of FIG. 1A.

Embodiments of a variable-width border mask method as described herein may be implemented as or in a stand-alone application or as a module of or plug-in for a graphics application or graphics library that may provide other graphical/digital image processing tools. Embodiments may be implemented as a stand-alone command in an application, or as a pre-processing step for image processing operations such as generating object masks. Examples of types of applications in which embodiments may be implemented include, but are not limited to, scientific, medical, painting, publishing, digital photography, video editing, games, animation, and/or other applications in which digital image processing may be performed. Specific examples of applications in which embodiments may be implemented may include, but are not limited to, Adobe® Photoshop®, Adobe® Illustrator®, and Adobe® After Effects®.

Figure 4:
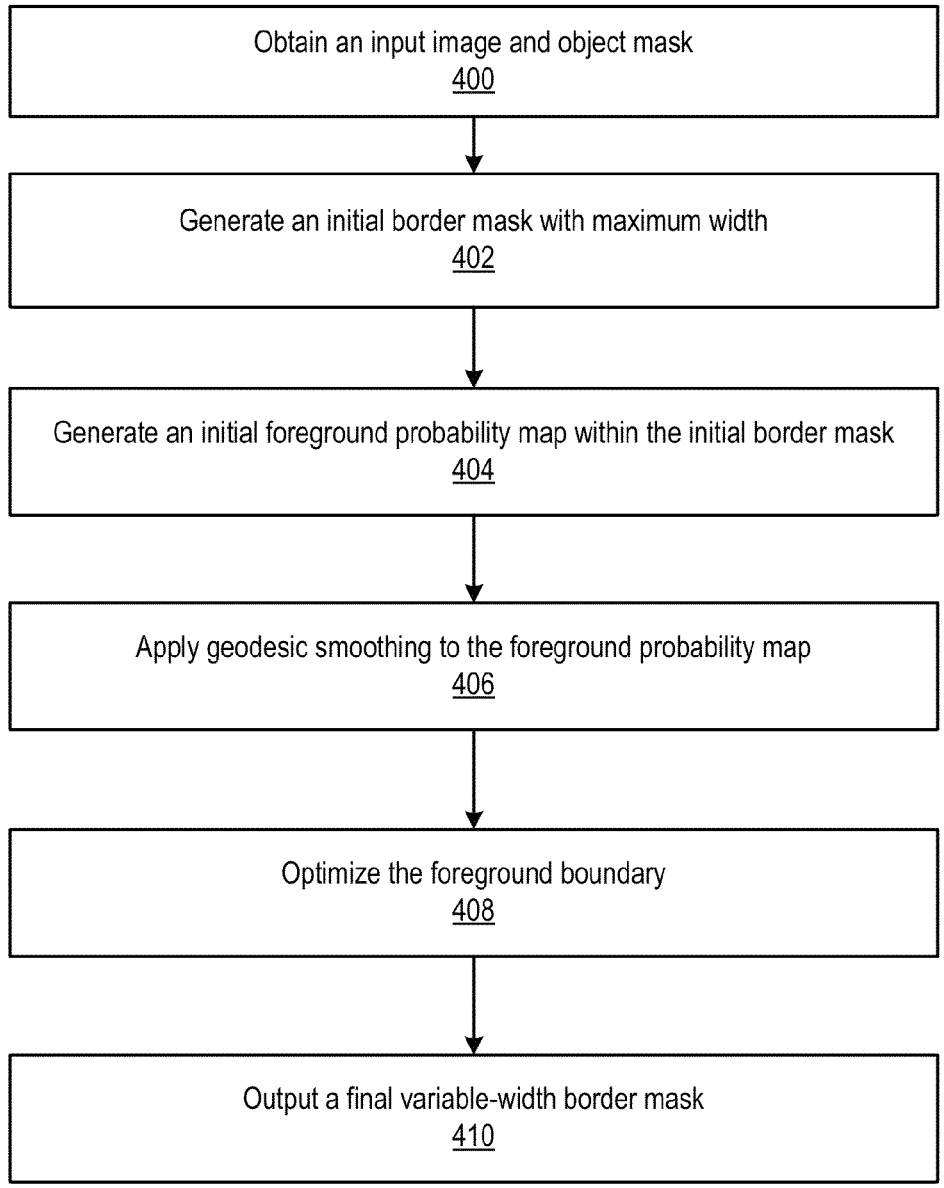
FIG. 4 is a flowchart of a variable-width border mask method according to some embodiments.

FIG. 4 is a flowchart of a variable-width border mask method according to some embodiments. As indicated at 400, an input image and object mask representing the initial binary selection may be obtained. FIG. 2A shows an example input image. The input image may be a digitally-captured image such as a digital photograph, a digitized image such as a digitized conventional photograph, a digital video frame, or in general any digital image. The initial binary selection may be specified or provided by a user. FIG. 2B shows an initial binary selection of an object (the dog) in the example image shown in FIG. 2A. The dotted curve represents the initial binary selection; the region inside the curve may be considered the object mask. In some embodiments, the input object mask may be a bitmap or similar data structure that indicates the selected region inside the binary selection curve (the dotted line of FIG. 2B). Some embodiments may receive other input, such as a maximum width value as described below.

Figure 5A:
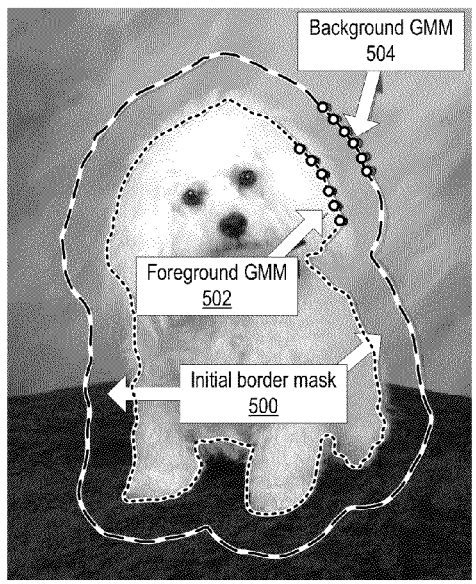
FIG. 5A shows an example of an initial foreground mask that may be generated from the input image and initial binary selection illustrated in FIGS. 2A and 2B according to a specified maximum width, according to some embodiments.

As indicated at 402, given the input image and the initial object mask, an initial border mask may be generated. In some embodiments, this initial border mask is of a uniform width. In some embodiments, the uniform width is set to a maximum width for the border mask. The maximum width may be a parameter for which the value specifies the maximum width of the border mask. In some embodiments, the value of the maximum width parameter may be specified by the user. In some embodiments, the initial border mask may define a range for the variable-width border mask method; the final variable-width border mask may lie within the initial (maximum width) border mask, but not extend outside it. FIG. 5A shows an example of an initial foreground mask 500 that may be generated from the input image and initial binary selection illustrated in FIGS. 2A and 2B according to a specified maximum width, according to some embodiments. In FIG. 5A, the region between the dotted and dashed curves is the initial foreground mask 500. The dotted curve and the dashed curve represent an inner (foreground) border and an outer (background) border, respectively.

Figure 5B:
FIG. 5B shows an example initial foreground probability map generated from FIG. 5A according to some embodiments.

As indicated at 404, an initial foreground probability map may be generated within the initial border mask. A Gaussian mixture color modeling technique may be used in generating the initial foreground probability map. In some embodiments this technique may generate a foreground Gaussian Mixture model (GMM) and a background GMM from the initial border mask. Some embodiments may use pixels at the inner (foreground) border of the initial border mask to train the foreground GMM, and pixels at the outer (background) border of the initial border mask to train the background GMM. FIG. 5A also shows examples of training a foreground GMM 502 and a background GMM 504 from initial foreground mask 500. The circles represent pixels under the respective borders. In some embodiments, all pixels on the respective borders may be used in training the respective GMMs. After training the GMMs, the GMMs may be applied to the initial border mask to generate the initial foreground probability map. FIG. 5B shows an example initial foreground probability map 510 generated from FIG. 5A according to some embodiments. The initial foreground probability map may include all pixels and only the pixels within the initial foreground mask 504. Pixels classified as foreground pixels (e.g., with a foreground probability of 1.0) are shown as white; pixels classified as background pixels (e.g., with a foreground probability of 0) are shown as black. Some pixels are shown as gray pixels within the initial foreground probability map, for example around the head of the dog; the foreground probability for these pixels is between 0 and 1.0. Embodiments of this technique for generating an initial foreground probability map are further described below.

Figure 5C:
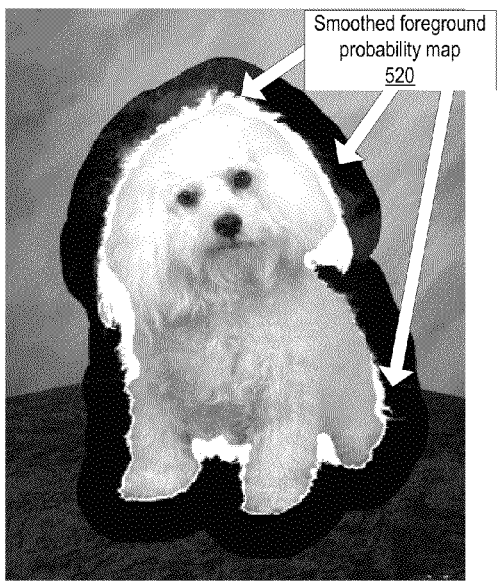
FIG. 5C shows an example smoothed foreground probability map generated from the initial foreground probability map of FIG. 5B according to some embodiments.

As indicated at 406, a geodesic smoothing technique may be applied to the initial foreground probability map generated at 404 to generate a smoothed foreground probability map. FIG. 5C shows an example smoothed foreground probability map 520 generated from the initial foreground probability map 510 of FIG. 5B according to some embodiments. Embodiments of this smoothing technique are further described below.

Figure 5D:
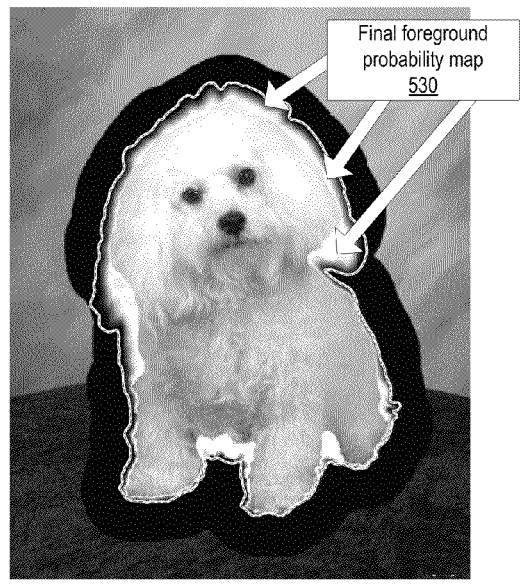
FIG. 5D shows an example final foreground probability map, after optimization, that may be generated from the smoothed foreground probability map of FIG. 5C according to some embodiments.

As indicated at 408, an optimization technique may be applied to optimize the foreground boundary, and a final variable-width border mask may be generated. FIG. 5D shows an example final foreground probability map 530, after optimization, that may be generated from the smoothed foreground probability map 520 of FIG. 5C according to some embodiments. The dashed curve represents the outer boundary of the final variable bandwidth border mask. Note that the black region outside this curve is not part of the final variable bandwidth border mask. Embodiments of an optimization technique that may be used are further described below.

As indicated at 410, the final variable-width border mask may be output. The variable-width border mask may, for example, be used as input to image matting algorithms to generate an accurate alpha mask of the foreground object selected from the input image. FIG. 3A shows an example of a variable-width border mask generated from the input shown in FIGS. 2A and 2B according to some embodiments. FIG. 3B shows an example alpha matte that may be generated from the variable-width border mask of FIG. 3A.

Generating an Initial Foreground Probability Map with GMM Color Modeling

As indicated at 404 of FIG. 4, an initial foreground probability map may be generated within an initial border mask. To create an accurate variable-width border mask, embodiments may apply foreground and background color analysis inside the initial border mask to discover the foreground border. A Gaussian Mixture color modeling technique may be used in generating an initial foreground probability map. Embodiments may sample pixels on the inner edge of the border mask as foreground color samples, and use these pixels to train a Gaussian Mixture Model (GMM) for the foreground, as shown in FIG. 5A. Similarly, embodiments may sample pixels on the outer edge of the border mask and use them to train a background GMM model, as shown in FIG. 5A. Mathematically, given a new pixel color c (c is in Lab color space), some embodiments may compute a foreground probability $P_F$ for c as:

$$P_F(c) = \sum_{i=1}^{N} w_F^i \exp\left(-\frac{(c - m_F^i)^2}{\sigma_F^{i\,2}}\right)$$

where N represents a maximum number of Gaussians. In some embodiments, N may be set to 10. In some embodiments, N may be a variable, and thus may be selectively set to different values. The parameter $m_F^i$, represents the mean of the Gaussian, $w_F^i$ represents a weight for the Gaussian, and $\sigma_F^i$ represents covariance of the Gaussian; $w_F^i$, $m_F^i$, and $\sigma_F^i$ may be estimated from training samples.

Similarly, a background probability $P_B$ may be computed for c as:

$$P_B(c) = \sum_{i=1}^{N} w_B^i \exp\left(-\frac{(c - m_B^i)^2}{\sigma_B^{i\,2}}\right)$$

and a normalized foreground probability P(c) may be computed as:

$$P(c) = \frac{P_F(c)}{P_F(c) + P_B(c)}$$

FIG. 5B shows an initial foreground probability map 510 in the border mask computed using a GMM color modeling technique. The probability map may be noisy since it is computed for every pixel independently. In some embodiments, the initial foreground probability map may be improved, for example by applying geodesic smoothing as described below.

Geodesic Smoothing

Figure 6:
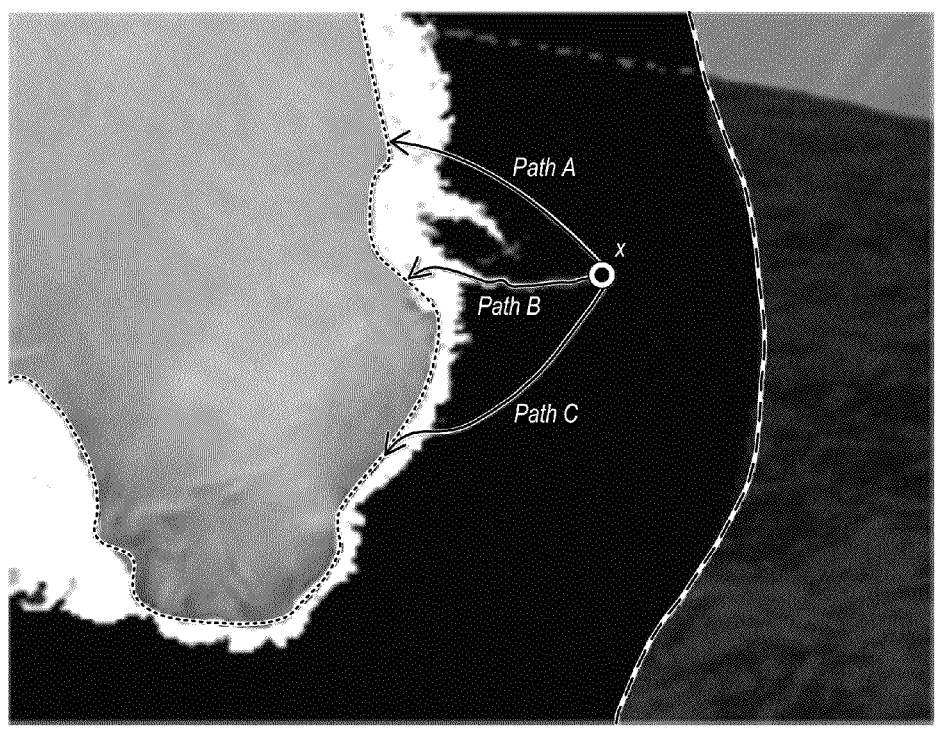
FIG. 6 illustrates geodesic distance as used in geodesic smoothing according to some embodiments.

As indicated at 406 of FIG. 4, a geodesic smoothing technique may be applied to the initial foreground probability map to generate a smoothed foreground probability map. Some embodiments may apply geodesic smoothing on the initial foreground probability map to reduce or eliminate noise. For a pixel x inside the initial border mask, embodiments may compute the pixel's geodesic distance to the inner edge (foreground edge) of the border mask ($d_F(x)$) as:

$$d_F(x) = \min_{\Gamma \in R_{x,F}} \int_0^1 |P'(s)| ds$$

where $R_{x,F}$ is the collection of all possible paths from pixel x to the inner edge, $\Gamma$ is one such path, and $\int_0^1 |P'(s)|ds$ is the integration of the magnitudes of probability gradients along this path. FIG. 6 illustrates geodesic distance as used in geodesic smoothing according to some embodiments. Suppose there are three paths from pixel x to the inner edge of the border mask (e.g., paths A, B, and C of FIG. 6). To compute the geodesic distance, some embodiments may walk along each path, and accumulate the sum of the probability differences between neighboring pixels on the path. The path which has the minimal sum (in FIG. 6, path B) is considered the shortest path from x to the inner edge, and the value of the minimal sum is the geodesic distance $d_F(x)$.

Similarly, some embodiments may compute a geodesic distance from pixel x to the outer edge of the border mask ($d_B(x)$). A new foreground probability may then be computed as:

$$P_F(x) = \frac{d_B(x)}{d_F(x) + d_B(x)}$$

For nearby pixels, the geodesic distances to the foreground and background edges may be similar, and thus their final foreground probability may be similar, which means that the foreground probability map may be locally smoothed. Furthermore, after geodesic smoothing, pixels closer to the foreground edge may have a higher foreground probability, while pixels closer to the background edge may have a lower foreground probability.

Optimizing the Foreground Boundary

As indicated at 408 of FIG. 4, an optimization technique may be applied to optimize the foreground boundary. As shown in FIG. 5C, after geodesic smoothing, the foreground probability map is much smoother; however, it may still contain some errors shown as gray regions near the top of the dog. This may be caused by color ambiguities; the background colors in these regions may be similar to foreground colors.

To further improve the foreground boundary, some embodiments may employ the following optimization process. An energy function to be minimized may be defined as:

$$E = \sum_x \left[ (P_F(x) - \tilde{P}_F(x))^2 + \lambda \cdot \exp\left(-\frac{|\nabla I_x|}{\sigma}\right) \cdot |\nabla P_F(x)|^2 \right]$$

under the boundary constraint that:

$$P_F(x) = \begin{cases} 1, \text{ if } x \text{ is attached to the inner edge} \\ 0, \text{ if } x \text{ is attached to the outer edge} \end{cases}$$

The sum is over all pixels x inside the border mask. $\tilde{P}_F(x)$ is the previously computed foreground probability, $|\nabla I_x|$ is the magnitude of image gradient at pixel x, and $|\nabla P_F(x)|$ is the magnitude of the gradient of the foreground probability map at pixel x. $\lambda$ and $\sigma$ are set to be constants. For two neighboring pixels in the border mask, if their color difference is small (i.e., $|\nabla I_x|$ is small and $$\lambda \cdot \exp\left(-\frac{|\nabla I_x|}{\sigma}\right)$$

is large), then the two pixels may be encouraged to have the same foreground probability value, since by minimizing E, $|\nabla P_F(x)|$ is forced to be a small number. In contrast, if the color difference is large between two neighboring pixels, then the two pixels can take different foreground probability values. In summary, minimizing the energy function E may work to force the foreground probability to stay flat in smooth regions, and only change across the actual foreground boundary.

The defined energy E has a quadratic form, and thus in some embodiments may be minimized by solving a first order linear system. As shown in FIG. 5D, after the optimization process, the foreground boundary inside the initial border mask may be accurately identified in the optimized foreground probability map. The identified foreground boundary is the outer boundary of the variable-width border mask output by the variable-width border mask method. In some embodiments, the outer edge of the initial binary selection or object mask received as input may be used as the inner boundary of the variable-width border mask. In some embodiments, the outer edge of the initial binary selection or object mask received as input may be moved inwards n pixels, for example 5 pixels, and the adjusted object mask boundary may be used as the inner boundary of the variable-width border mask. Some embodiments may provide an inner boundary adjustment variable via which the user may adjust the number of pixels by which the inner boundary is to be adjusted, or set the adjustment to 0 so that the boundary is not adjusted.

Figure 7A:
FIGS. 7A and 7B show another example of the variable-width border mask method applied to an input image using an initial binary selection, according to some embodiments.
Figure 7B:
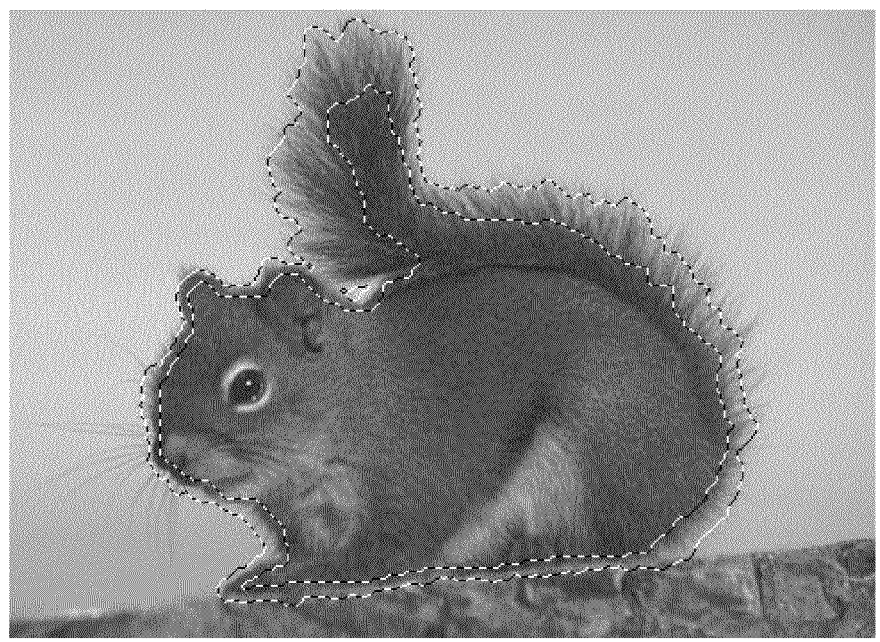

FIGS. 7A and 7B show another example of the variable-width border mask method applied to an input image using an initial binary selection, according to some embodiments. FIG. 7A shows an input image and an input initial binary selection. FIG. 7B shows a final variable-width border mask that may be generated according to an embodiment of a variable-width border mask method as described above.

Note that there may be some errors in a variable-width border mask, although the errors may be less than errors in fixed-width border masks generated using conventional techniques. For example, some parts of the object may be outside the variable-width border mask (as can be seen in the hairs outside the variable-width border mask of FIG. 7), and some parts of the image may be included in the variable-width border mask. In some embodiments, one or more tools may be provided to the user via a user interface whereby the user may correct errors in, or otherwise modify, the variable-width border mask, for example by selecting image content to be included in the variable-width border mask. For example, a border brush tool may be provided via which a user may interactively add pixels to or remove pixels from a variable-width border mask.

Some embodiments may include a means for generating variable-width border masks as described herein. For example, a toolkit, application, or library may include a module for generating variable-width border masks. See, for example, variable-width border mask module 810 of FIG. 8. Alternatively, some embodiments may provide multiple modules for performing components of a variable-width border mask method described herein, such as initial border mask generation as described at 402 of FIG. 4, initial foreground probability map generation using a Gaussian mixture modeling technique as described at 404 of FIG. 4, probability map smoothing using a geodesic smoothing technique as described at 406 of FIG. 4, and probability map optimization as described at 408 of FIG. 4. The module(s) may in some embodiments be implemented by a computer-readable storage medium and one or more processors (e.g., CPUs) of a computing apparatus. An example computer system in which embodiments of the module(s) may be implemented is illustrated in FIG. 9. The computer-readable storage medium may store program instructions executable by the one or more processors to cause the computing apparatus to perform variable-width border mask generation as described herein to generate a variable-width border mask. Other embodiments of the module(s) may be at least partially implemented by hardware circuitry and/or firmware stored, for example, in a non-volatile memory. Embodiments of the module(s), may be implemented, for example, as stand-alone applications, modules in other applications, modules in libraries, modules in toolkits, and so on.

Figure 8:
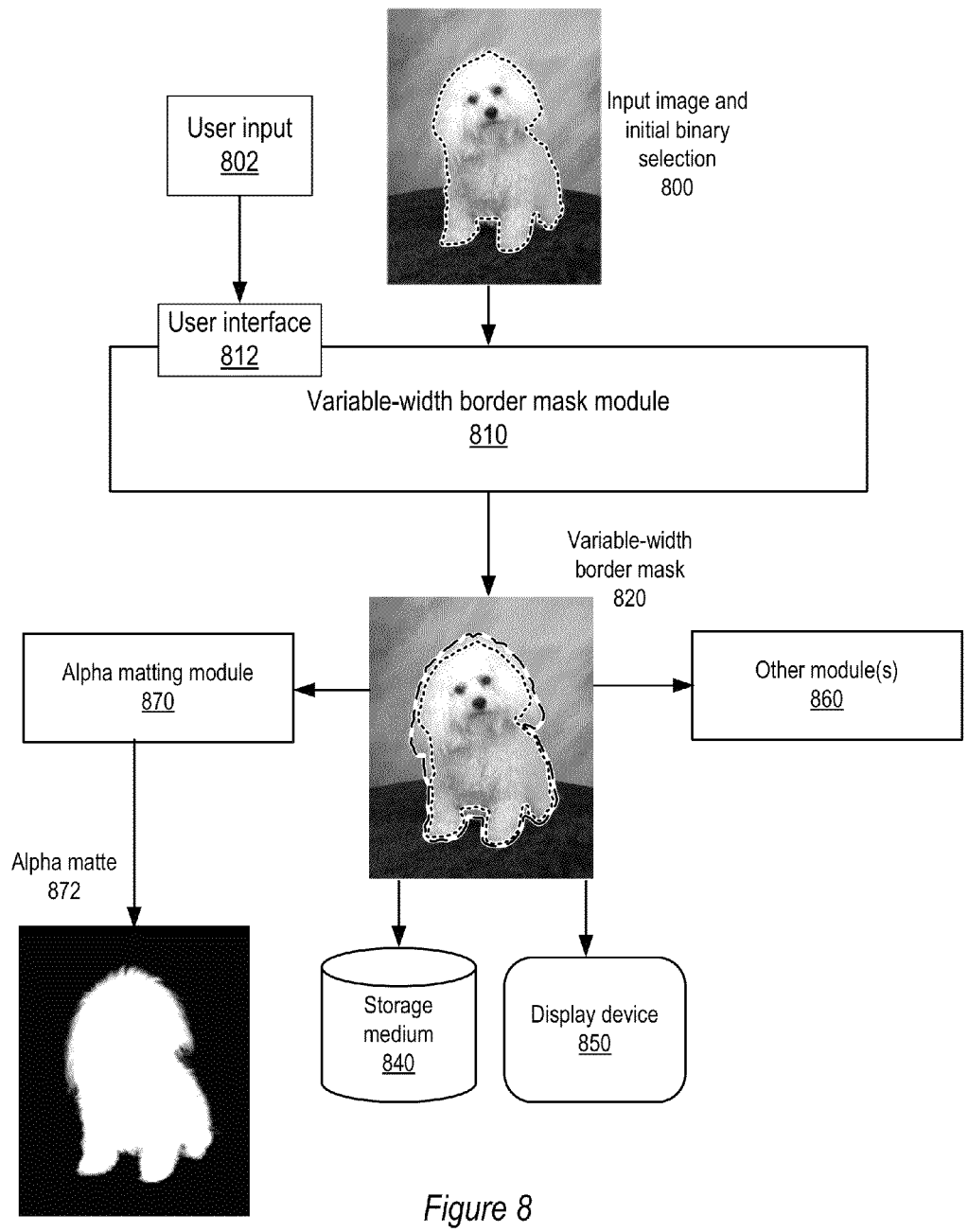
FIG. 8 illustrates a variable-width border mask module that may generate variable-width border masks from input images, initial border masks, and possibly other input, according to some embodiments.
Figure 9:
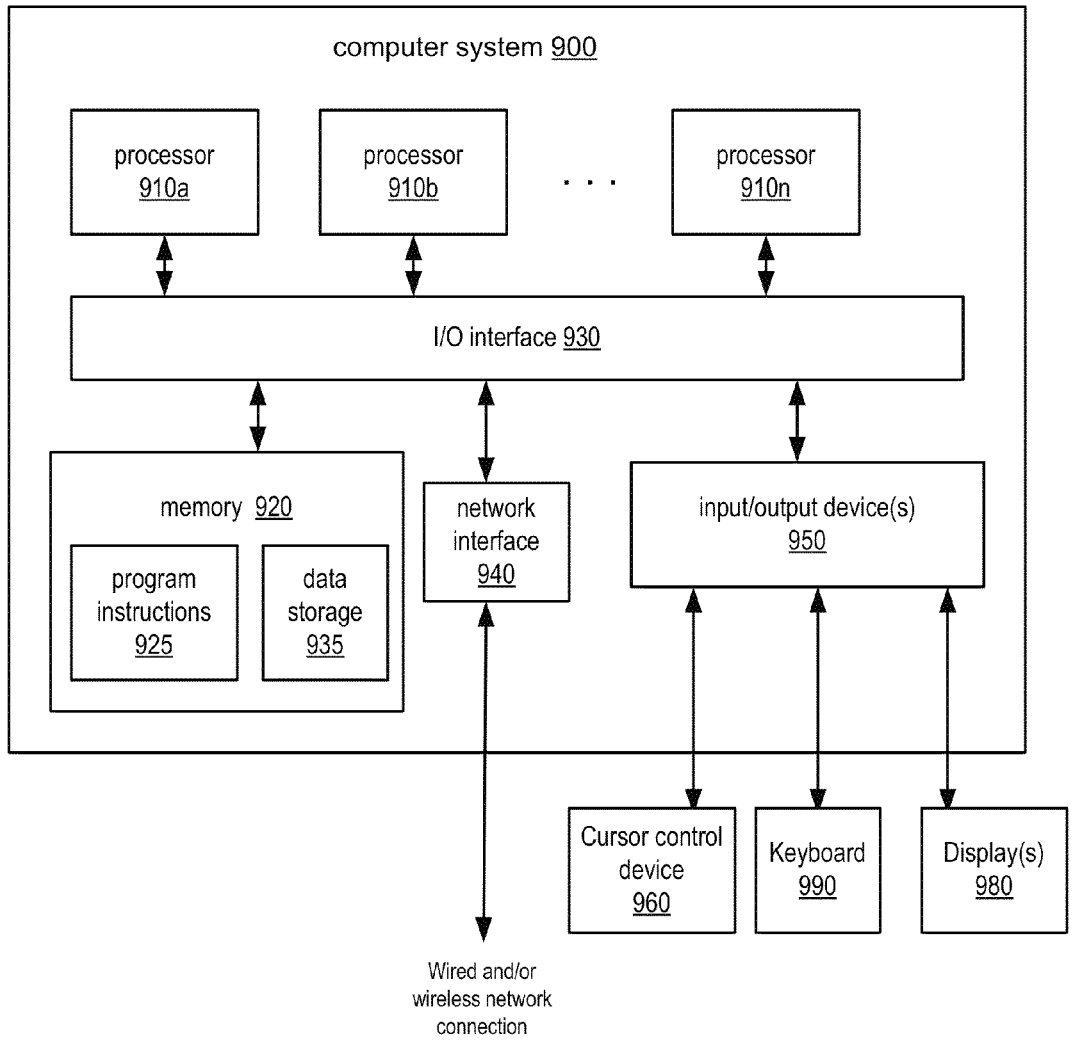
FIG. 9 illustrates an example computer system that may be used in embodiments.

FIG. 8 illustrates a variable-width border mask module that may generate variable-width border masks from input images, initial border masks, and possibly other input, according to some embodiments. Variable-width border mask module 810 may implement a variable-width border mask method as described above. Initial border mask generation as described at 402 of FIG. 4, initial foreground probability map generation using a Gaussian mixture modeling technique as described at 404 of FIG. 4, probability map smoothing using a geodesic smoothing technique as described at 406 of FIG. 4, and probability map optimization as described at 408 of FIG. 4 may be implemented as submodules of variable-width border mask module 810 or alternatively may be implemented as separate modules, for example as modules in a library. FIG. 9 illustrates an example computer system on which embodiments of local region selection module 810 may be implemented. Referring to FIG. 8, variable-width border mask module 810 receives an input image 800, an initial binary selection (shown as the dotted line in image 800), and possibly user input (e.g., values for one or more parameters such as a maximum width parameter). In some embodiments, variable-width border mask module 810 may provide a user interface 812 via which a user may interact with the module 810, for example to specify values for one or more parameters to be used in the variable-width border mask method as described herein. Variable-width border mask 810 processes the input image 800, initial binary selection, and possibly user input according to the methods described herein, for example according to the method illustrated in FIG. 4. Variable-width border mask 810 generates as output a variable-width border mask 820. Variable-width border mask 820 may, for example, be stored to a storage medium 840, such as system memory, a disk drive, DVD, CD, etc. Instead, or in addition, final region selection mask 820 may be displayed to a display device 850, provided to an alpha matting module 870 that uses the mask 820 to generate an alpha matte 872 for the image 800, or may be provided to one or more other modules 860 for additional processing by or application in other image processing techniques.

Example System

Various components of embodiments of a variable-width border mask method as described herein may be executed on one or more computer systems, which may interact with various other devices. One such computer system is illustrated by FIG. 9. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 990, audio device 990, and display(s) 980. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

In some embodiments, at least one processor 910 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for variable-width border mask generation may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 920 may be configured to store program instructions and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a variable-width border mask method, are shown stored within system memory 920 as program instructions 925 and data storage 935, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or CD/DVD-ROM coupled to computer system 900 via I/O interface 930. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 940.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement embodiments of a variable-width border mask method as described herein, and data storage 935, comprising various data accessible by program instructions 925. In one embodiment, program instructions 925 may include software elements of a variable-width border mask method illustrated in the above Figures. Data storage 935 may include data that may be used in embodiments, for example input PDF documents or output layout-preserved text documents. In other embodiments, other or different software elements and/or data may be included.

Those skilled in the art will appreciate that computer system 900 is merely illustrative and is not intended to limit the scope of a variable-width border mask method as described herein. In particular, the computer system and devices may include any combination of hardware or software that can perform the indicated functions, including computers, network devices, internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
   generating an initial border mask from an object mask, wherein the object mask indicates an initial boundary selection for a foreground object in an image, and wherein the initial border mask specifies a maximum region outside the object mask for a border of the foreground object in the image;
   generating an initial foreground probability map for the initial border mask according to a Gaussian mixture color modeling technique applied within the initial border mask, wherein the initial foreground probability map indicates, for each pixel of the image within the initial border mask, a probability that the pixel is a foreground pixel;
   smoothing the initial foreground probability map according to a geodesic smoothing technique to generate a smoothed foreground probability map, wherein the geodesic smoothing technique smoothes the probability for each pixel in the initial foreground probability map according to location of the pixel relative to at least one boundary of the initial border mask;
   determining a foreground boundary within the initial border mask from the smoothed foreground probability map; and
   generating a variable-width border mask for the foreground object according to the determined foreground boundary, wherein the variable-width border mask is defined by an inner boundary and an outer boundary, wherein the determined foreground boundary corresponds to the outer boundary of the variable-width border mask, wherein the variable-width border mask specifies a variable-width region of the image outside the object mask for the border of the foreground object.

2. The computer-implemented method as recited in claim 1, wherein said generating an initial foreground probability map for the initial border mask according to a Gaussian mixture color modeling technique comprises:
   training a foreground Gaussian Mixture color model (GMM) using pixels on an inside boundary of the initial border mask;
   training a background GMM using pixels on an outside boundary of the initial border mask; and
   applying the foreground GMM and the background GMM to all pixels within the initial border mask to generate the initial foreground probability map.

3. The computer-implemented method as recited in claim 2, wherein said applying the foreground GMM and the background GMM to all pixels within the initial border mask to generate the initial foreground probability map comprises, for each pixel within the initial border mask:
   computing a foreground probability $P_F$ and a background probability $P_B$ for the pixel; and
   computing a normalized foreground probability P for the pixel as:

$$P = \frac{P_F}{P_F + P_B}.$$

4. The computer-implemented method as recited in claim 1, wherein said smoothing the initial foreground probability map according to a geodesic smoothing technique comprises, for each pixel of the image within the initial border mask:
   computing a geodesic distance $d_F$ from the pixel to an inner boundary of the initial border mask;
   computing a geodesic distance $d_B$ from the pixel to an outer boundary of the initial border mask;
   computing a new foreground probability for the pixel from $d_F$ and $d_B$.

5. The computer-implemented method as recited in claim 1, wherein said determining a foreground boundary within the initial border mask from the smoothed foreground probability map comprises:
   applying an optimization technique to the smoothed foreground probability map to produce an optimized foreground probability map that includes the foreground boundary; and
   determining the foreground boundary from the optimized foreground probability map.

6. The computer-implemented method as recited in claim 5, wherein the optimization technique minimizes an energy function under a boundary constraint.

7. The computer-implemented method as recited in claim 1, wherein an outer boundary of the object mask corresponds to the inner boundary of the variable-width border mask.

8. A system, comprising:
   at least one processor; and
   a memory comprising program instructions, wherein the program instructions are executable by the at least one processor to:
     generate an initial border mask from an object mask, wherein the object mask indicates an initial boundary selection for a foreground object in an image, and wherein the initial border mask specifies a maximum region outside the object mask for a border of the foreground object in the image;
     generate an initial foreground probability map for the initial border mask according to a Gaussian mixture color modeling technique applied within the initial border mask, wherein the initial foreground probability map indicates, for each pixel of the image within the initial border mask, a probability that the pixel is a foreground pixel;
     smooth the initial foreground probability map according to a geodesic smoothing technique to generate a smoothed foreground probability map, wherein the geodesic smoothing technique smoothes the probability for each pixel in the initial foreground probability map according to location of the pixel relative to at least one boundary of the initial border mask;

determine a foreground boundary within the initial border mask from the smoothed foreground probability map; and generate a variable-width border mask for the foreground object according to the determined foreground boundary, wherein the variable-width border mask is defined by an inner boundary and an outer boundary, wherein the foreground boundary corresponds to an outer boundary of the variable-width border mask, wherein the variable-width border mask specifies a variable-width region of the image outside the object mask for the border of the foreground object.

9. The system as recited in claim 8, wherein, to generate an initial foreground probability map for the initial border mask according to a Gaussian mixture color modeling technique, the program instructions are executable by the at least one processor to:

train a foreground Gaussian Mixture color model (GMM) using pixels on an inside boundary of the initial border mask;

train a background GMM using pixels on an outside boundary of the initial border mask; and apply the foreground GMM and the background GMM to all pixels within the initial border mask to generate the initial foreground probability map.

10. The system as recited in claim 8, wherein, to smooth the initial foreground probability map according to a geodesic smoothing technique, the program instructions are executable by the at least one processor to, for each pixel of the image within the initial border mask:

compute a geodesic distance $d_F$ from the pixel to an inner boundary of the initial border mask;

compute a geodesic distance $d_B$ from the pixel to an outer boundary of the initial border mask;

compute a new foreground probability for the pixel from $d_F$ and $d_B$.

11. The system as recited in claim 8, wherein, to determine a foreground boundary within the initial border mask from the smoothed foreground probability map, the program instructions are executable by the at least one processor to:

apply an optimization technique to the smoothed foreground probability map to produce an optimized foreground probability map that includes the foreground boundary; and determine the foreground boundary from the optimized foreground probability map.

12. The system as recited in claim 11, wherein the optimization technique minimizes an energy function under a boundary constraint.

13. The system as recited in claim 8, wherein an outer boundary of the object mask corresponds to the inner boundary of the variable-width border mask.

14. A non-transitory computer-readable storage medium storing program instructions, wherein the program instructions are computer-executable to implement:

generating an initial border mask from an object mask, wherein the object mask indicates an initial boundary selection for a foreground object in an image, and wherein the initial border mask specifies a maximum region outside the object mask for a border of the foreground object in the image;

generating an initial foreground probability map for the initial border mask according to a Gaussian mixture color modeling technique applied within the initial border mask, wherein the initial foreground probability map indicates, for each pixel of the image within the initial border mask, a probability that the pixel is a foreground pixel;

smoothing the initial foreground probability map according to a geodesic smoothing technique to generate a smoothed foreground probability map, wherein the geodesic smoothing technique smoothes the probability for each pixel in the initial foreground probability map according to location of the pixel relative to at least one boundary of the initial border mask;

determining a foreground boundary within the initial border mask from the smoothed foreground probability map; and generating a variable-width border mask for the foreground object according to the determined foreground boundary, wherein the variable-width border mask is defined by an inner boundary and an outer boundary, wherein the foreground boundary corresponds to the outer boundary of the variable-width border mask, wherein the variable-width border mask specifies a variable-width region of the image outside the object mask for the border of the foreground object.

15. The non-transitory computer-readable storage medium as recited in claim 14, wherein, in said generating an initial foreground probability map for the initial border mask according to a Gaussian mixture color modeling technique, the program instructions are computer-executable to implement:

training a foreground Gaussian Mixture color model (GMM) using pixels on an inside boundary of the initial border mask;

training a background GMM using pixels on an outside boundary of the initial border mask; and applying the foreground GMM and the background GMM to all pixels within the initial border mask to generate the initial foreground probability map.

16. The non-transitory computer-readable storage medium as recited in claim 15, wherein said applying the foreground GMM and the background GMM to all pixels within the initial border mask to generate the initial foreground probability map comprises, for each pixel within the initial border mask:

computing a foreground probability $P_F$ and a background probability $P_B$ for the pixel; and computing a normalized foreground probability P for the pixel as:

$$P = \frac{P_F}{P_F + P_B}.$$

17. The non-transitory computer-readable storage medium as recited in claim 14, wherein, in said smoothing the initial foreground probability map according to a geodesic smoothing technique, the program instructions are computer-executable to implement, for each pixel of the image within the initial border mask:

computing a geodesic distance $d_F$ from the pixel to an inner boundary of the initial border mask;

computing a geodesic distance $d_B$ from the pixel to an outer boundary of the initial border mask;

computing a new foreground probability for the pixel from $d_F$ and $d_B$.

18. The non-transitory computer-readable storage medium as recited in claim 14, wherein, in said determining a foreground boundary within the initial border mask from the smoothed foreground probability map, the program instructions are computer-executable to implement:

applying an optimization technique to the smoothed foreground probability map to produce an optimized foreground probability map that includes the foreground boundary; and determining the foreground boundary from the optimized foreground probability map.

19. The non-transitory computer-readable storage medium as recited in claim 18, wherein the optimization technique minimizes an energy function under a boundary constraint.

20. The non-transitory computer-readable storage medium as recited in claim 14, wherein an outer boundary of the object mask corresponds to the inner boundary of the variable-width border mask.

* * * * *